United States Patent [19]
Stiles et al.

[11] 3,842,606
[45] Oct. 22, 1974

[54] BEACH-PROTECTORS

[76] Inventors: Wade Stiles, P.O. Box 151, Palm City, Fla. 33490; George V. R. Dunan, 4170 Raynolds Ave., Miami, Fla. 33133

[22] Filed: Mar. 16, 1972

[21] Appl. No.: 235,446

Related U.S. Application Data

[63] Continuation of Ser. No. 788,495, Feb. 4, 1969, abandoned.

[52] U.S. Cl. .......................................... 61/38, 61/3
[51] Int. Cl. ............................................. E02b 3/12
[58] Field of Search ..................... 61/3, 4, 5, 37, 38

[56] References Cited
UNITED STATES PATENTS

| | | | |
|---|---|---|---|
| 2,092,183 | 9/1937 | Rehfeld | 61/38 |
| 2,295,422 | 9/1942 | Neely et al. | 61/38 |
| 3,191,386 | 6/1965 | Wiegel et al. | 61/5 |
| 3,276,210 | 10/1966 | Stitt | 61/5 |
| 3,323,310 | 6/1967 | Arpin | 61/3 |
| 3,353,361 | 11/1967 | Lloyd | 61/3 |

*Primary Examiner*—Peter M. Caun
*Attorney, Agent, or Firm*—Laurence R. Brown

[57] ABSTRACT

Means for controlling shore drift and erosion caused by moving water and improvements in beach protection consisting in the use of used automobile, truck, and other vehicular pneumatic tires, said tires being connected to each other and forming spaces within the arrangement and means for anchoring the tires where necessary. The used tires are laid as a mat creating solids and walled voids. The mat's solids are unique in that they are both flexible and resilient and aid Nature's own pattern of sand retention. Sand is deposited both in and around the tires as the surf tumbles shoreward and again as the swash and undertow gravitates seaward. The tires also form a flexible and resilient barrier to protect the present beach from the turbulent waters of the surf.

9 Claims, 4 Drawing Figures

BEACH-PROTECTORS

This is a continuation Ser. No. 788,495, filed Feb. 4, 1969, now abandoned.

The apparatus has a safety factor not usually found in beach protectors in that it is flexible and resilient and therefore less damaging if struck by a boat or human.

The usual placing of the invention does not alter the inclusive beauty of a beach as the installation will be below the low-tide surface.

FIELD OF THE INVENTION

This invention relates generally to apparatus for controlling the erosion of land and more particularly pertains to appartus comprising a plurality of used automobile, truck and other vehicular pneumatic tires which are fastened together and secured to the land or beach by suitable anchors, if securing is necessary. The joined, flexible and resilient characteristics of these tires makes their placing highly versatile in relation to bottom configuration, current direction, and wave direction. An example of a placement off a strand which has a gently sloping bottom would be to place the tire mat parallel to the beach and at a sufficient depth, and off-shore distance, that a barrier-beach would be created. The tire mat must close two land promontories or be close to the beach. This then creates a closed-end subaqueous terrace, which upon retaining sand from both the shore-bound translation waves and the long-short current, becomes a barrier-beach. As this barrier builds, sand then is deposited between it and the foreshore. Additional tire mats can be placed on the barrier-beach as sand is retained. The elevating of this barrier-beach or terrace changes the inclination from the spot where the barrier-beach was created and the shore crest, thus changing the velocity of the sand-laden water returning by gravity to the sea.

This invention with its plurality of used tires joined together can also be used when sand is artificially placed on a badly eroded beach. The tires would be placed a proper distance off shore for the retention of the artificially placed sand. In this use this invention becomes an articulated, flexible, and resilient underwater bulkhead, which is believed to be new to the engineering of Beach Reclamation.

The erosion of beaches in some sections has become so severe that it is restricting the number of recreational users, and this at a time when the population increase has need for more beaches. This condition is the grave concern of the land owners with littoral rights, the municipalities, the States and the Federal Government, and this invention with a plurality of used, and difficult to dispose of tires, has the adaptability that makes it of value to all.

THE PRIOR ART

While many solutions have been advanced and attempted in the past to correct this erosion condition, such as to erect barriers of one type or another, these solutions have not proven feasible for one or a number of reasons. The biggest disadvantage has been the fact that the solutions usually were not economically feasible in that they required the use of too much manpower and most complex types of apparatus for carrying out the projects.

OBJECTS OF THE INVENTION

Accordingly, an object of the present invention is to provide apparatus for controlling the erosion of beaches which requires no manufacture of a special piece of apparatus. It is something that is a national and growing problem in its ultimate disposition and for the most part confronts every community. What can be done with used and discarded automobile tires Every day this problem of disposing of these tires increases but nothing seems to be done about it. This invention will alleviate the problem to a large extent while at the same time it will greatly help to prevent the loss of millions of dollars worth of valuable property fronting on oceans by the constant erosion that is taking place.

Another object of the present invention is to make use of apparatus for controlling the erosion of beaches and the like which apparatus need not be manufactured near the site where such apparatus is to be located. The used automobile tires throughout this nation exist in numbers totalling millions. Hence, the ever-present disposal problem can be alleviated to a large extent by employing used tires in the manner disclosed herein.

In furtherance of the above objects, the apparatus of the present invention comprises a plurality of used automobile, truck, and other vehicular pneumatic tires which are laid, after a study of the forces and bottom conditions, in an area to be protected. The mat's configuration, size, placement in relation to shore, shall be to use Nature's own movements and not to oppose those forces.

DETAILED DESCRIPTION OF THE PREFERRED EMBODIMENT

With continued reference to the drawings, the improved beachprotector consists essentially of a plurality of mats 1 and 2, each consisting of yieldable materials, such as used and discarded automobile tires, arranged in rows and secured to each other or woven together to form large mats of indefinite length and width depending upon the dimensions of the beach to be protected. By this is meant that one dimension of the beach would extend from the land-side property line to the surf; the other dimension of the beach would extend longitudinally thereof and follow the natural edge of the surf.

Figure 1:
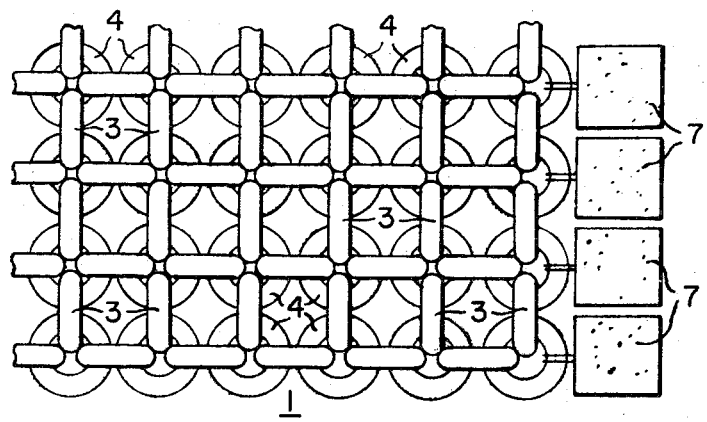
FIG. 1 is a plan view of the improvement, showing a plurality of tires fastened together by interlocking them and anchoring them to the beach.
Figure 2:
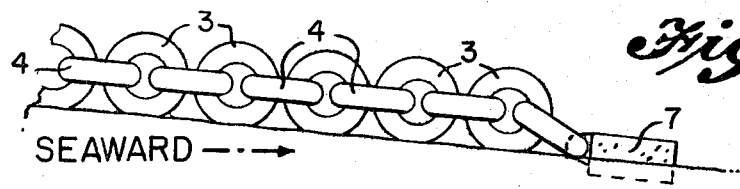
FIG. 2 is a side elevation of the improvement as applied in FIG. 1.

The tires, a in FIGS. 1 and 2, are arranged in horizontal and vertical rows 3 and 4. The vertical rows 3 are formed by placing the used tires on their treads in a tire-to-tire position in the beach. The tires in the vertical rows are then caused to be inter-locked by the horizontal rows of tires. One way of accomplishing this would be to cut each tire in the horizontal rows crosswise in one area of the tire and then temporarily spreading the tire and inter-locking it with a tire in the vertical row, thus making a mat in which the tires in the vertical rows are partially supported in the sand and the tires in the horizontal rows are raised above the sand because of their interlocked arrangement.

Should the tires in the vertical rows be placed deeply in the sand, then it would follow that the tires in the horizontal rows would not be raised at all above the sand or at least nominally thereabove.

Figure 3:
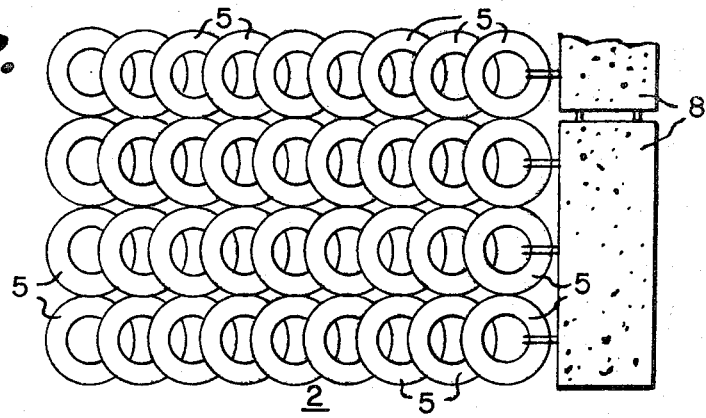
FIG. 3 is a plan view of a modified form of the improvement.
Figure 4:
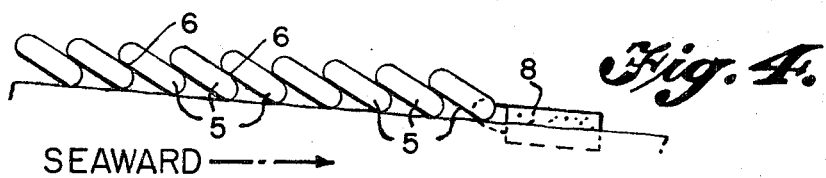
FIG. 4 is a side elevation of the improvement as applied in FIG. 3.

Now in FIGS. 3 and 4 the tires are placed in rows extending seaward and conform to the beach slope, being secured to each other by suitable fastening means 6, forming no part of the invention. The fastening means would constitute no problem to those skilled in the art, but it would be most important to note that the tires are arranged as in FIG. 4, overlapping each other in shingle fashion and directed in a shoreward direction. In all the arrangements thus far noted, the spaces between tires and rows of tires are innumerable to say nothing of the interiors of the tires which are exposed to the waterborne sand as the time passes. The tires become filled with sand and the spaces between the rows of tires gradually fill up with water-borne sand. Every time the surf breaks over the joined tires, waterborne sand is deposited and not too much returns to the ocean when the surf recedes. In time, as the beach has filled in and assumes some of its former characteristics, another mat, following the teachings herein disclosed, may be located on top of the mat now almost buried and thus the vertical height of the beach may be improved. In other words, when it is desired to reclaim land, a second layer of mats is placed on the first layer after the latter has been covered with sand - that is, has been imbedded in sand — and this operation may be repeated as often as necessary until the desired height of land is attained.

By the arrangement described, the beach to be protected or rebuilt is carpeted by mats, the several mats being securely held in position on the beach by anchors, such as iron stakes, much-room anchors, or the concrete anchors 7 and 8 shown in the drawings. No invention is asserted in the type of anchoring means employed. Placement of these anchors is dependent upon the conditions prevailing on the beach to be rebuilt.

What is claimed is:

1. A beach-protector, comprising a plurality of used pneumatic type automobile tires arranged in horizontal and vertical rows, those tires in the vertical rows having contact with the beach to be protected, those tires in the horizontal rows being slightly elevated above the beach; all of said tires being inter-locked with each other to form a mat with spaces between the rows, and means for anchoring the mat to the beach.

2. A beach-protector, as described in claim 1 in which those tires in the vertical rows have contact with the beach to be protected and are seawardly directed.

3. A beach-protector, comprising a plurality of used pneumatic type automobile tires arranged in parallel rows and directed seawardly, said tires being connected with each other and resting on the beach in shingle-like contact and leaning away from the sea.

4. A beach-protector comprising a plurality of used pneumatic type automobile tires connected with each other to form a mat in contact with the beach in an underwater position.

5. A beach-protector as defined in claim 4, wherein the tires are connected together in horizontal and vertical rows with spaces between the rows.

6. A beach-protector as defined in claim 5, wherein the tires are inter-locked to form a flexible and resilient mat.

7. A beach-protector comprising a plurality of resilient yieldable automobile tires presenting an accessible and yielding interior cavity for accumulating sand therein connected together to form a flexible and resilient array contacting the bottom of a beach to intercept turbulent sand carrying water moving shorewardly and out again in waves to thereby receive and deposit sand in and about said bodies.

8. A beach-protector as defined in claim 7, wherein the array comprises a mat having a dimension extending longitudinally to follow the natural edge of the shore.

9. A beach-protector as defined in claim 7, wherein the array comprises a mat having a dimension extending from the land into the surf.

* * * * *